M. W. RYAN AND M. UTTENDORFER.
RADIOMETER.
APPLICATION FILED NOV. 9, 1921.
1,422,378.
Patented July 11, 1922.
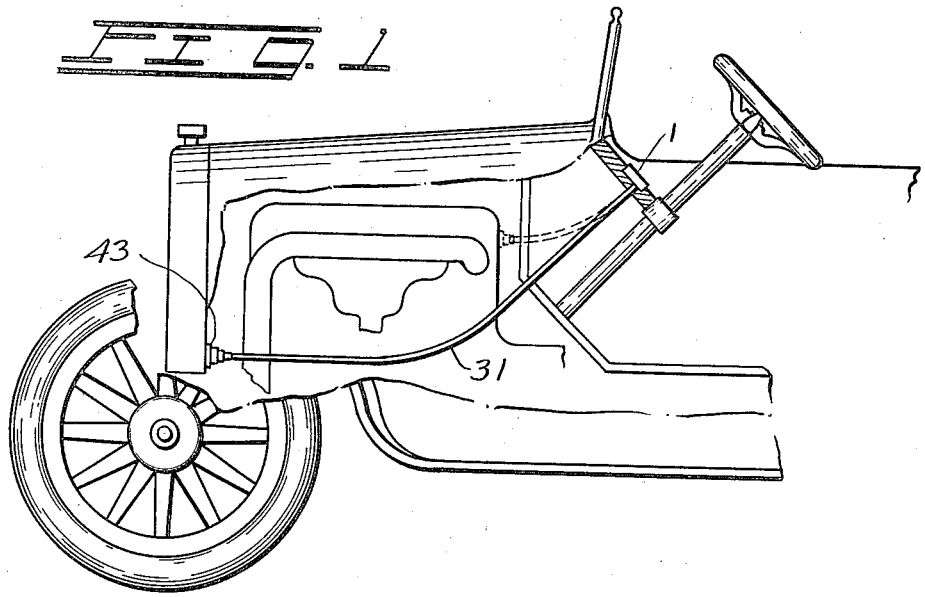
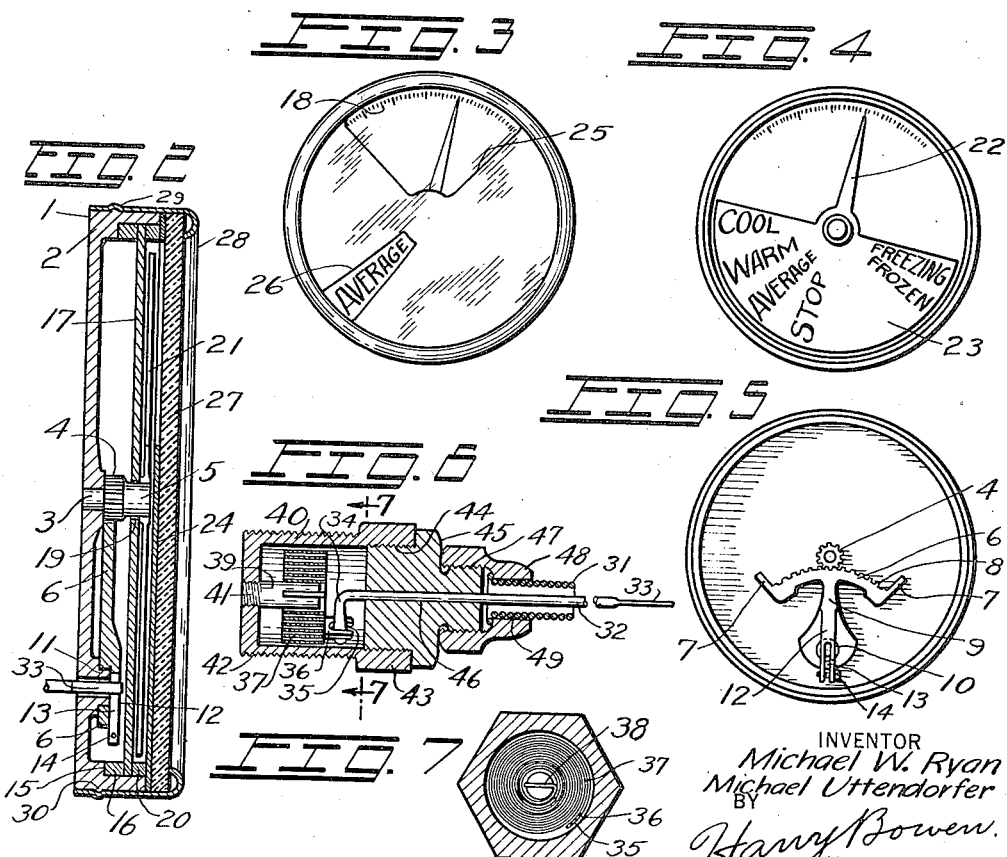
INVENTOR
Michael W. Ryan
Michael Uttendorfer
BY
Harry Bowen.
ATTORNEY

UNITED STATES PATENT OFFICE.

MICHAEL W. RYAN AND MICHAEL UTTENDORFER, OF SEATTLE, WASHINGTON.

RADIOMETER.

1,422,378.  Specification of Letters Patent.  Patented July 11, 1922.

Application filed November 9, 1921. Serial No. 513,991.

*To all whom it may concern:*

Be it known that we, MICHAEL W. RYAN and MICHAEL UTTENDORFER, citizens of the United States, residing at Seattle, county of King, and State of Washington, have invented a new and useful Radiometer; and we do hereby declare that the following is a full, clear, and exact specification, such as will enable others skilled in the art to which it appertains to make and use the same.

The invention is a device for determining the temperature of the water in an automobile radiator or engine manifold, which may be read from the instrument board.

The object of the invention is to provide a device for determining the temperature of the water in the manifold of the engine or radiator of an automobile, the thermostatic end of which may be placed either in the radiator or the water jacket of the engine and the instrument end of which may be placed on the instrument board so that it may be easily read by the driver.

Another object of the invention is to construct a thermostat by using a coil spring similar to a watch spring inside of a plug and holding the center of it on a small plug inside of the larger plug and having a fork shape projection on its outer end into which a flattened lever from the end of a piece of wire will project so that as the temperature rises, thereby causing the diameter of each coil of the spring which is made of thermostatic metal to increase, the outer end of the spring will move in an arc about its center and thereby cause the wire to rotate.

A still further object of the invention is to provide a very sensitive dial by holding the pointer on a small gear in the center and having a larger gear segment pivoted near the outside mesh with the small gear; the gear segment having a slotted hole at its pivot point through which a small flat bar may project so that as the small flat bar is twisted it will cause the gear segment to twist and move the pointer.

With these ends in view, the invention embodies a plug which may be screwed into an automobile radiator or into the water jacket of the engine having a spring similar to a clock spring inside of it, a nut in the end of a plug with a hole in its center forming a bearing for a wire or flexible shaft whose end may be bent to form a small lever which projects into a fork shape projection on the end of the spring, another nut on the end of this nut with a hole in its outer end for holding the end of a piece of flexible tubing. This tubing is a housing for the flexible shaft and may extend from the plug to the back of the instrument board where the flexible shaft projects into a dial for registering the distance the spring expands or contracts as it changes its temperature.

This dial is constructed with a casing with a small pin in its center over which is a small spur gear with an extended hub and meshing with this gear is a gear segment pivoted on a hub between the center and the outside of the casing with a slot in its upper side over the point at which it is pivoted into which the flat end of the flexible shaft projects. Directly on top of the gears is a flat disc which rests upon a spacer ring in the casing and on the top of which is a row of divisions spaced to indicate degrees of heat and on top of this is a pointer which is fixedly mounted on the hub of the small gear which projects through the disc. On top of the pointer is another disc with two openings in it, one through which the pointer may be seen while through the other words to indicate the condition of the water may appear, and on top of this is a glass disc which is held in place by a cap and this is held in place by being squeezed over a notch on the outside of the casing.

Other features and advantages of the invention will appear from the following description taken in connection with the drawings, wherein :—

Figure 1 is a side elevation of part of an automobile with a part broken away.

Figure 2 is a cross section on the center line of the dial.

Figure 3 is a front elevation of the dial.

Figure 4 is a front elevation of the dial with the cap, glass and first disc removed.

Figure 5 is an elevation of the dial with all of the discs removed showing the gears.

Figure 6 is a cross section on the center line of the thermostat.

Figure 7 is a section on line 7—7 of Figure 6.

In the drawings we have shown our meter as it would be installed in Figure 1 wherein numeral 1 indicates the dial which is mounted on the instrument board and constructed with a casing 2 which has a pin 3 in its center and on this the small pinion 4 is freely mounted which has the hub 5 extending from it. Meshing with the pinion 4 is the segmental gear 6 which is constructed as shown in Figure 5 with prongs 7 at each end of the teeth 8 to prevent it from riding off of the pinion. This segment is held on the stem 9 in which is a hole 10 which slides over a collar 11 on the casing. Just above the hole 10 is a prong 12 which is fastened to the stem 9 and in which is a slot 13. The outer ends of the prong 12 are held together by a small screw 14.

In a recess 15 of the casing 2 is a spacing ring 16 upon which the disc 17 which has the graduations 18 on it rests. In the center of this disc is a hole 19 through which the hub 5 projects and on top of this disc is another spacing ring 20 which provides a space for the indicator 21. The indicator 21 is fixedly mounted on the end of the hub 5 so that it will turn with it and is shaped as shown in Figure 4 with a pointer 22 extending upward and a segment 23 extending downward. On the segment 23 may be placed any desired words to indicate the condition of the water. On top of the indicator 21 is another disc 24 in which are the openings 25 and 26 as shown in Figure 3 and on top of this disc is a glass disc 27 which is held in place by the cap 28 the sides of which slide over the outside of the casing 2 and have a notch 29 in them which snap over a ridge 30 on the casing.

In Figure 6 we have shown a cross section of the thermostatic end of our device which is connected to the dial 1 by the flexible tube 31 in which is the wire or flexible shaft 32. On one end of this wire is a flat section 33 which projects through the sleeve 11 of the casing and into the slots 13 of the segmental gear as shown in Figure 2. On the opposite end of the wire 32 is a lever 34 as shown in Figure 6 and this passes through a slot 35 in the projection 36 which is on the end of the coil spring 37. The coil spring 37 is held in a slot 38 in the top of a plug 39 and this plug is screwed into the large plug 40 in the hole 41. The large plug 40 has threads 42 on its outer surface by which it may be screwed into the walls of an automobile radiator or into the walls of the water jacket around the engine. The open end of the plug 40 is shaped to form a hexagonal nut 43, and on the inside of this nut are threads 44 into which the nut 45 may be screwed. In the inside of this nut 45 is a hole 46 which forms a bearing for the end of the wire 32 and on the other end of this nut is a shank 47 over which the cap 48 is screwed. In the end of the cap 48 is a hole 49 which holds the end of the flexible tube 31.

It will be understood that changes may be made in the construction without departing from the spirit of the invention. One of which changes may be in the use of any flexible material in place of the wire 32, another may be in the omission of the flexible tubing around the wire, another may be in the design of the housing for the spring 37, another may be in the reversing of the action of the spring, and still another may be in the type of dial used on the instrument board.

The construction will be readily understood from the foregoing description. To use the device it may be installed as shown in Figure 1 and as the temperature of the water in the radiator rises or drops the spring 37 will either expand or contract and in doing so will twist the lever 34 so as to move its outer end in an arc about its center which action will twist the shaft 32 and as the flat section 33 on the end of this shaft projects into the slot in the segmental gear 6 it will twist this segment about its center or pivot point. As this rotates it will rotate the small pinion 4 and this will cause the pinion 4 to rotate which moves the pointer 22. Ordinarily this pointer should set in the position as shown in Figure 3 with the word "Average" showing through the opening 26 but if the temperature of the water rises until it is too hot the word "Stop" will appear in the opening which will warn the driver to stop and find out what is the trouble with the engine. Or if the water is too cold the disc will rotate in the opposite direction and the word "Freeze" will appear in the side of the opening 25.

Having thus fully described the invention, what we claim as new and desire to secure by Letters Patent is:—

1. A device of the class described embodying a plug, a small plug inside of it, a coil spring similar to a watch spring made of thermostatic metal mounted in a slot in the small plug, a projection on the outer end of the spring, having a slot in it, a lever on the end of a wire projecting through the slot, a nut in the plug forming a bearing for the wire, a cap on the nut, a flexible tube held in the end of the cap, a cylindrical shaped casing, having a hole in its lower side, a flat bar projecting through the hole, a wire connecting this flat bar to the lever which projects through the slot in the projection on the spring, a gear segment mounted over the hole in the casing, having a slot in its end through which the flat bar also projects, a small pinion mounted on a pin in the casing meshing with the gear segment, a hub on the side of the small gear, a disc on top of these gears through which the hub projects, a spacing ring on which the disc rests, a pointer on the end of the hub outside of the disc, another spacing ring outside of the disc, another disc outside of the pointer, a glass disc on top of this one and a cap on the outside which may be sprung over a ridge on the casing.

2. A radio meter of the type described embodying a coil spring, a small plug with a slot in which the center of the coil spring is held, a larger plug in which the small plug is held, a projection on the end of the spring with a slot in it, a flexible shaft held in the end of a plug, a lever on the end of the shaft projecting into the slot on the projection of the spring, a flexible tube surrounding the shaft, a casing at the other end of the flexible tube, a rectangular shaped end on the opposite end of the shaft projecting through a hole in the casing, a segmental gear inside of the casing having a slot in it through which the end of the shaft projects, a pinion meshing with the gear, a hub on the pinion, an indicator on the hub and suitable discs with openings in them and graduation marks on them for registering the degrees of heat.

3. A device of the class described comprising a coil spring, a small plug with a slot in which the inner end of the coil spring is held, a larger plug in which the small plug is held, a projection on the outer end of the spring with a slot in it, a flexible shaft held in the end of the larger plug, a lever on the end of the shaft projecting into the slot in the projection of the spring and suitable means for registering the amount of expansion or contraction of the spring through the turning of the shaft.

4. A device of the class described comprising a coil spring, a small plug with a slot in which the inner end of the coil spring is held, a larger plug in which the small plug is held, a projection on the end of the spring with a slot in it, a flexible shaft held in the end of the larger plug, a lever on the end of the shaft projecting into the slot in the projection of the spring, a flexible tube surrounding the shaft extending from the plug to the instrument board, a dial at the end of the tube with indications on it to register the degrees of temperature, suitable gears connecting the end of the shaft to the dial to rotate an indicator as the spring expands or contracts and the dial having a suitable opening through which words may appear to show the condition of the water.

MICHAEL W. RYAN.
MICHAEL UTTENDORFER.